US011153443B2

(12) United States Patent
Kelley, Jr. et al.

(10) Patent No.: US 11,153,443 B2
(45) Date of Patent: Oct. 19, 2021

(54) SYSTEM AND METHOD FOR CALCULATING SIP KPIS FOR A TIME WINDOW

(71) Applicant: NetScout Systems, Inc, Westford, MA (US)

(72) Inventors: Bruce A. Kelley, Jr., Westford, MA (US); Rajeev Nadkarni, Chelmsford, MA (US); Abhishek Saraswati, Santa Clara, CA (US); Erdem Uysal, Westborough, MA (US); Sandeep Prasad, San Jose, CA (US)

(73) Assignee: NetScout Systems, Inc, Westford, MA (US)

( * ) Notice: Subject to any disclaimer, the term of this patent is extended or adjusted under 35 U.S.C. 154(b) by 272 days.

(21) Appl. No.: 15/439,770

(22) Filed: Feb. 22, 2017

(65) Prior Publication Data

US 2018/0241641 A1 Aug. 23, 2018

(51) Int. Cl.
*H04M 7/00* (2006.01)
*H04L 29/06* (2006.01)
*H04L 12/26* (2006.01)

(52) U.S. Cl.
CPC ........ *H04M 7/0084* (2013.01); *H04L 43/026* (2013.01); *H04L 43/04* (2013.01);
(Continued)

(58) Field of Classification Search
CPC .................................................. H04L 43/026
(Continued)

(56) References Cited

U.S. PATENT DOCUMENTS

2006/0250988 A1* 11/2006 Garcia .................... H04L 65/80
370/260
2011/0249572 A1* 10/2011 Singhal ................... H04L 43/08
370/252

(Continued)

FOREIGN PATENT DOCUMENTS

WO WO-2009008783 A1 1/2009

OTHER PUBLICATIONS

Extended European Search Report for European Patent Application No. EP18157699.2, dated Jun. 20, 2018.

*Primary Examiner* — Kevin T Bates
*Assistant Examiner* — Emad Siddiqi
(74) *Attorney, Agent, or Firm* — Locke Lord LLP; Scott D. Wofsy; Christopher J. Capelli

(57) ABSTRACT

A system and method is provided for calculating session initiation protocol (SIP) key performance indicators (KPIs) for multimedia communication in a network accessing network packets monitored over time. The method includes accessing network packets monitored over time, detecting a SIP response message of the monitored network packets, and accounting for the detected SIP response message in a time window of a series of consecutive time windows that includes the SIP response message's associated observed time. The SIP response message has an associated observed time at which the monitored SIP message was observed during monitoring. The method further includes pairing a SIP request message expected to be paired with the detected SIP response message with the detected SIP response message and accounting for the paired SIP request message in the time window with which the detected SIP response message is accounted. The method further includes calculating a KPI for the time window using the detected SIP
(Continued)

response message and its paired SIP request message that are accounted for in the time window.

17 Claims, 4 Drawing Sheets

(52) U.S. Cl.
CPC .......... *H04L 65/1006* (2013.01); *H04L 65/80* (2013.01); *H04L 43/18* (2013.01)

(58) Field of Classification Search
USPC ........................................................ 709/219
See application file for complete search history.

(56) References Cited

U.S. PATENT DOCUMENTS

| | | |
|---|---|---|
| 2015/0163271 A1 | 6/2015 | Handurukande et al. |
| 2017/0149626 A1* | 5/2017 | Yoon ................... H04L 41/5067 |
| 2017/0214534 A1* | 7/2017 | Rivas Molina ....... H04L 65/105 |

* cited by examiner

SYSTEM AND METHOD FOR CALCULATING SIP KPIS FOR A TIME WINDOW

FIELD OF THE INVENTION

The present technology relates to network monitoring and, more particularly, methods and systems to calculate session initiation protocol (SIP) key performance indicators (KPIs).

BACKGROUND OF THE INVENTION

In order to monitor or analyze initiation and management of multimedia or voice over internet (VOIP) sessions using session initiation protocol (SIP), service providers calculate key performance indicators (KPIs) such as session establishment effectiveness ratio (SEER), answer seizure ratio (ASR), network effectiveness ratio (NER), and session completion ratio (SCR). These KPIs use counts of SIP request messages and corresponding SIP response messages. Service providers demand high accuracy of these KPIs, such as to the order of double or triple decimal digits. However, when KPIs are calculated for a given time period, a request and its corresponding response may fall in different time windows, and all requests may not be accounted for each response seen in a time window of interest, and vice versa.

Conventional methods for calculating SIP KPIs include correlating different SIP messages of respective SIP sessions, which include correlating SIP response messages to SIP request messages, tracking the SIP sessions, and creating detailed records (xDRs) for each SIP session. It is only after the xDRs are created that KPIs can be calculated and aggregated. Several problems arise. XDRs are finalized only after a SIP session is completed. Hence, KPIs can be calculated only after associated calls are completed, without the availability of determining the KPIs in near real-time. In addition, correlation of SIP messages and SIP session tracking is resource intensive in terms of consumption of central processor unit (CPU) and time usage. Furthermore, additional storage systems are needed for storing and tracking SIP session data and storing xDRs. The associated resource cost reduces performance and scalability. Furthermore, delays for calculating KPIs are incurred due to the multiple step process of creating xDRs, only after which KPIs can be calculated or aggregated. This also results in the need for large storage systems to store the xDRs.

Such conventional methods and systems have generally been considered satisfactory for their intended purpose. However, there is still a need in the art for accurate KPI calculation that can be performed in near real-time with reduced resource intensity with regards to memory, CPU and disk usage. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method for calculating session initiation protocol (SIP) key performance indicators (KPIs) for multimedia communication in a network accessing network packets or packet summaries monitored over time. The method includes accessing network packets or packet summaries monitored over time, detecting a SIP response message included in the monitored network packets or packet summaries, and accounting for the detected SIP response message in a time window of a series of consecutive time windows that includes the SIP response message's associated observed time. The SIP response message has an associated observed time at which an associated packet was observed during monitoring.

The method further includes pairing a SIP request message expected to be paired with the detected SIP response message with the detected SIP response message, and accounting for the paired SIP request message in the time window with which the detected SIP response message is accounted. The method further includes calculating a KPI for the time window using the detected SIP response message and its paired SIP request message that are accounted for in the time window.

In accordance with another aspect of the disclosure, a system is provided for calculating session initiation protocol (SIP) key performance indicators (KPIs) for multimedia communication in a network accessing network packets or packet summaries monitored over time. The system includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
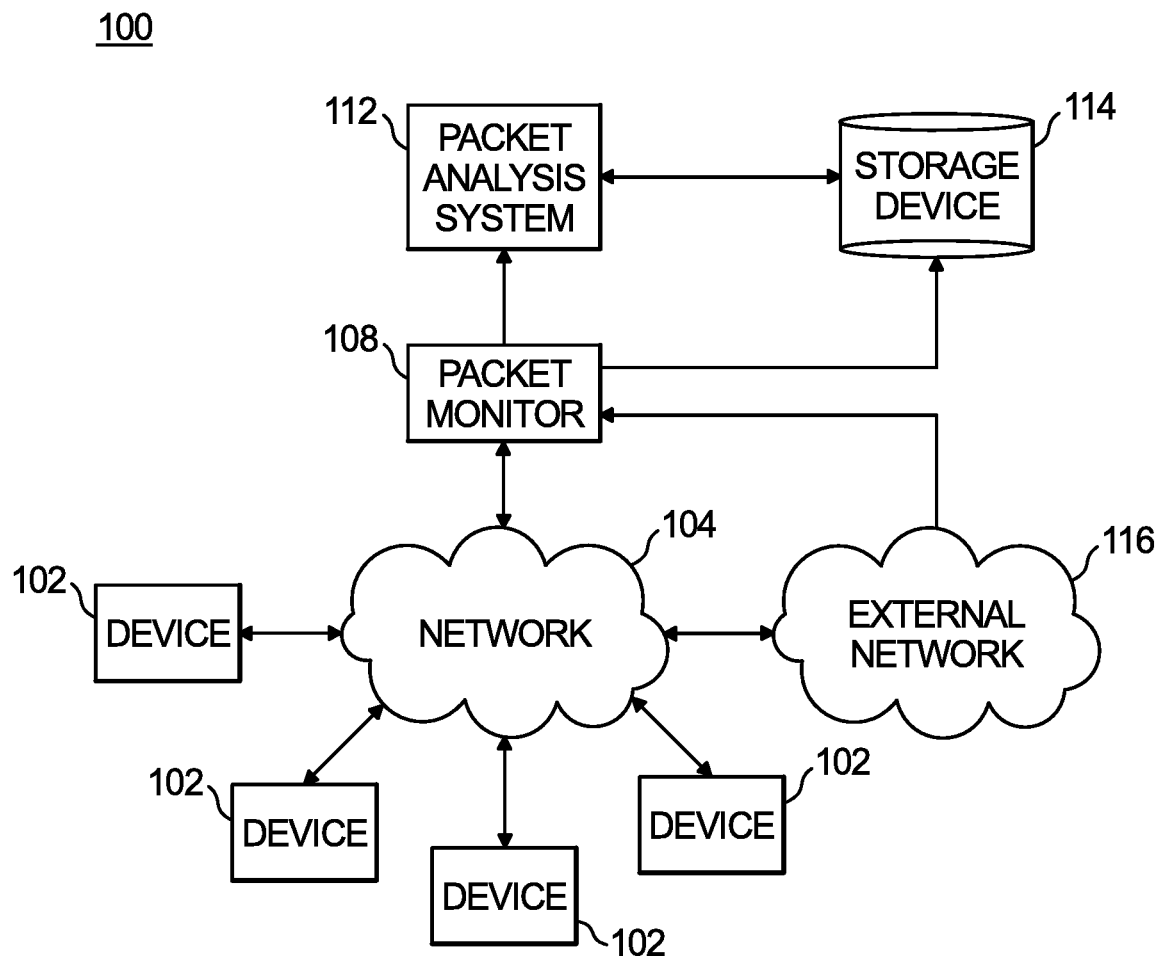
FIG. 1 illustrates a block diagram of an example network analytics system coupled to a network in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network analytics system in accordance with the disclosure is shown in FIG. 1 and is designated generally by reference character 100. Other embodiments of the network analytics system 100 in accordance with the disclosure, or aspects thereof, are provided in FIGS. 2-4, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes a plurality of devices 102 which are coupled to a network 104. The devices 102 can communicate with other devices 102 that are coupled to the same network or a different network via the network 104. The network 104 is an internet protocol (IP) network, which can be, for example, a network such as the Internet, a private network, a different public network, a cellular network, a personal communication service (PCS) network, a wired network, a wireless network, etc., and further include a public switched telephone network (PSTN). Network traffic can be between devices of the network 104 and or between devices of the network 104 and devices of an external network 118 via network 104.

The devices 102 can communicate with the network 104 and/or another device 102 via one or more communication links. These communication links can be wireless, wired, or a combination thereof. The devices 102 can include, for example, mobile computing devices, smart phones, servers, media servers, stationary computing devices, printers or multi-functions devices, sensors, and network devices, such as routers, switches, hubs, and bridges that are used to communicatively couple host devices 102 to one another.

The packet monitor 108 can be positioned inline with all or a portion of network traffic to monitor network traffic flowing to and from network 104. Additionally, packet intercept devices 106 can be distributed about the network 104 to intercept packets flowing at various locations of the network 104, including disposed at locations along communication links coupled to the network 104 and/or disposed at or integrated with devices 102 coupled to the network 104.

Packet intercept devices 106 can intercept and/or make copies of packets of the network traffic. The packet intercept devices 106 can be passive or active and include software, firmware, and/or hardware components, such as taps, probes, or port mirrors that can be positioned inline along communication links between any devices 102 or integrated with devices 102. In embodiments, the packet intercept devices 106 can include software modules, which can include software agents, or can be virtual devices that are remote relative to devices 102 and the communication links.

The packets intercepted by the packet intercept devices can be collected by the packet monitor 108, which can provide the packets, or create packet summaries and provide the packet summaries, to a storage device 114 and/or to a packet analysis system 112. Providing the packets or packet summaries can include storing the data such that they it can be accessed, or transmitting the data. The intercepted packets include SIP messages, which include SIP request or SIP response (also known as status) messages.

The packet monitor 108 and/or the intercept devices 106 can be located remotely from the packet analysis system 112. Alternatively, the packet monitor 108 can be co-located with, or embodied in, the packet analysis system 112.

The packet monitor 108 may be a special purpose computing device or a software component (not limited to a single process) dedicated to monitoring data communicated via the network 104. Alternatively, the packet monitor 108 may be a general purpose computing device with specialized software components installed thereon. In one embodiment, the packet monitor 108 is embodied as nGenius Collectors, nGenius Probes or nGenius InfiniStream, available from NetScout Systems, Inc. of Westford, Mass.

The packet analysis system 112 is hardware, software, firmware or a combination thereof for calculating SIP KPIs for voice or multimedia communication. The packet analysis system 112 may perform one or more of the following functions: (i) access the monitored network packets or packet summaries, (ii) detect one or more SIP response messages of the monitored network packets or packet summaries, each of the SIP response message(s) having an associated observed time at which an associated packet was observed during monitoring, (iii) account for the detected SIP response messages in their respective time windows of a series of consecutive time windows that includes the SIP response message's associated observed time, (iv) pair SIP request messages that are expected to be paired with the respective detected SIP response messages with the corresponding, respective SIP response messages, (v) account for the respective paired SIP request messages in the respective time windows with which the detected SIP response message is accounted, (vi) calculate one or more KPIs for one or more time windows using the detected SIP response messages and their respective paired SIP request messages that are accounted for in the window, and (vii) generate aggregation data based on an aggregation of a characteristic associated with SIP performance for one or more different SIP sessions associated with the detected SIP response messages and their respective paired SIP request messages using the calculated KPI(s). The term "SIP sessions" refers to SIP messages (including SIP request and response messages) associated with an entire internet protocol (IP) based voice or multimedia call or conference.

The packet analysis system 112 may be embodied as a general purpose computing device installed with specialized software for performing one or more of these operations. Alternatively, the packet analysis system 112 is embodied as a specialized computing device. In one embodiment, the packet analysis system 112 is a computing device running nGeniusONE available from NetScout Systems, Inc. of Westford, Mass.

Figure 2:
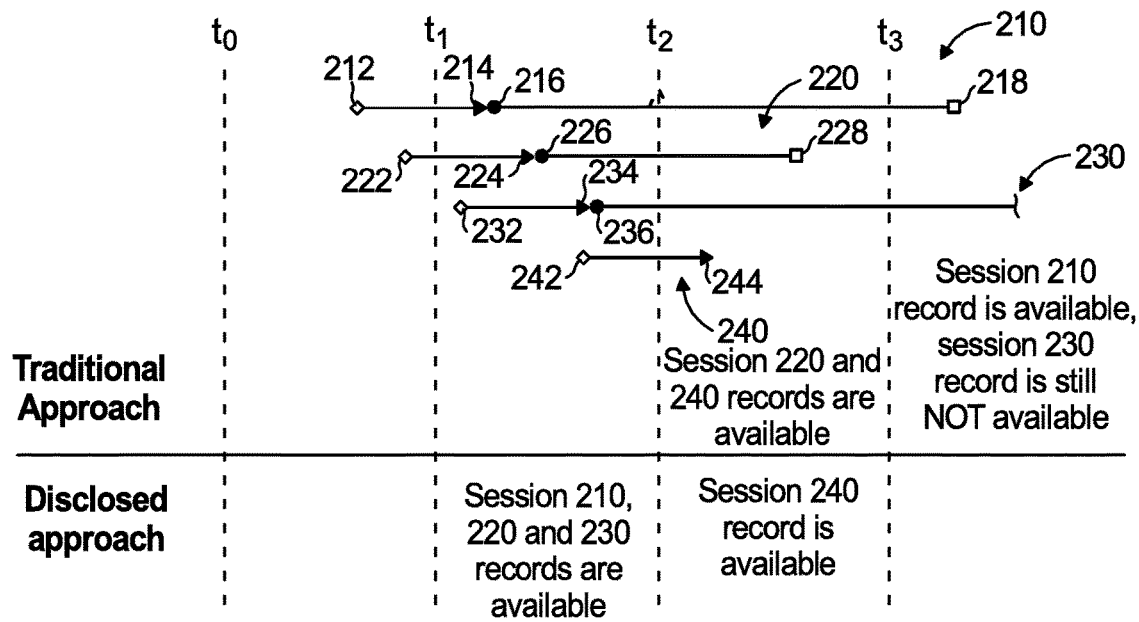
FIG. 2 illustrates a timing diagram of example session initiation protocol (SIP) sessions during a time interval, in accordance with an illustrative embodiment of the present disclosure.

With reference to FIG. 2, an example timing diagram 200 is shown of example SIP sessions 210, 220, 230, and 240 during a time interval that includes consecutive time windows beginning at times t0, t1, t2, and t3. The example shown in FIG. 2 is indicates information that is appropriate for calculating KIPs associated with session establishment, such as session establishment effectiveness ratio (SEER), answer seizure ratio (ASR), and/or ineffective session attempt (ISA). The timing diagram 200 also shows timing for sessions 220, 230, 240, and 250 for one or more of request messages, response messages, and session completion. The timing diagram 200 further indicates whether or not, and when, each of the sessions 220, 230, 240, and 250 are available for calculating KPIs using a traditional method and using the method described in this disclosure.

In accordance with the disclosed method, each request is accounted for in the time window during which the response to which it corresponds is observed. Accounting for the request is performed regardless of the time at which the request was observed. Accordingly, paired responses and pairs are accounted for in the same time window. Using this method, the number of responses and requests accounted for in a time window can be counted, wherein these counts reflect accurate request-response pairs. Furthermore, a response and request pair can be counted before the corresponding session is completed. Regardless of whether the session is completed, these counts can be used to calculate KPIs. This allows KPIs that use response-request pairs to be calculated for each and any time window in near real-time.

The actual time at which the request was observed can be recorded and used for other calculations that are outside of the scope of the present disclosure.

This method, thus, allows for accurate accounting of request/response pairs while allowing KPIs to be calculated based on packet or packet summary observations. This method does not need to wait for a session to be completed or perform session correlation by tracking all requests and corresponding responses. This method can be performed without waiting to complete an xDR before aggregating multiple xDRs. Rather, aggregation that includes observation times of paired responses and requests can be performed at any time window, including before the corresponding session has been completed.

A SIP session can be determined to be completed when a SIP BYE message or termination messages (e.g., a request an response) are observed, or when a determination is made that the corresponding call session has ended unexpectedly, such as when a session ages out due to expiration of an age-out timer. Specifically, regarding session 210, a request 212 is received in time window [t0, t1]; a response 214 is received in time window [t1, t2], after which session 210 is established at establishment condition 216. A session establishment condition can include, for example, receipt of a successful response (e.g., 200 OK) to an original session establishment request (e.g., INVITE). Thus, receipt of response 214 and satisfaction of the establishment condition 216 can be the same occurrence.

One skilled in the art will readily understand that session termination can include a request and response that are separated by time, and may fall within different time windows. As described with respect to session establishment, a session termination request is accounted for in the time window within which the response is seen. For the sake of simplicity, in FIG. 2, session completion for sessions 210 and 220 is shown by respective single points 218 and 228.

Session completion condition 218 occurs in the time window [t3, t4]. Regarding session 220, a request 222 is received in time window [t0, t1]; a response 224 is received in time window [t1, t2], after which session 210 is established at establishment condition 226. Session completion condition 228 occurs in the time window [t2, t3]. Regarding session 230, a request 232 is received in time window [t1, t2]; a response 234 is received in time window [t1, t2], after which session 210 is established at establishment condition 236. A session completion condition has not yet been observed. Accordingly, session 230 is ongoing. Regarding session 240, a request 242 is received in time window [t1, t2]; a response 244 is received in time window [t2, t3], however an establishment condition has not yet been observed and the session is not established, nor is session completion observed. This can occur, for example, when the request for session establishment (e.g., INVITE) received a failure response (e.g., 4xx, 5xx, 6xx). In case of a failure response, the session will be closed. The request is then marked as a failed attempt and no further requests or responses are expected for that session.

In the timing diagram 200, using the method of the disclosure, session requests 212, 222, and 232 are accounted for in time interval [t1, t2] and request 242 is accounted for in time interval [t2, t3]. Thus, KPIs calculated at time t2 would include information about establishment of sessions 210, 220, and 230 and KPIs calculated at time t4 would include information about establishment of session 240. This allows KPIs associated with establishment of a session, such as SEER, SER, and ISA to be calculated in near real-time. On the contrary, using a traditional method, KPI calculations at time t2 would not include any of sessions 210, 220, 230, 240; KPI calculations at time t3 would include only sessions 220 and 240; and KPI calculations at time t4 would include only session 210, whereas session 230 would not be included in KPI calculations because it had not yet completed as of t4. Similarly, KPIs associated with termination of a session (e.g., session completion ratio (SCR)) can be calculated by applying the same approach as used above, including accounting for requests in the time window in which the response is observed.

Figure 3:
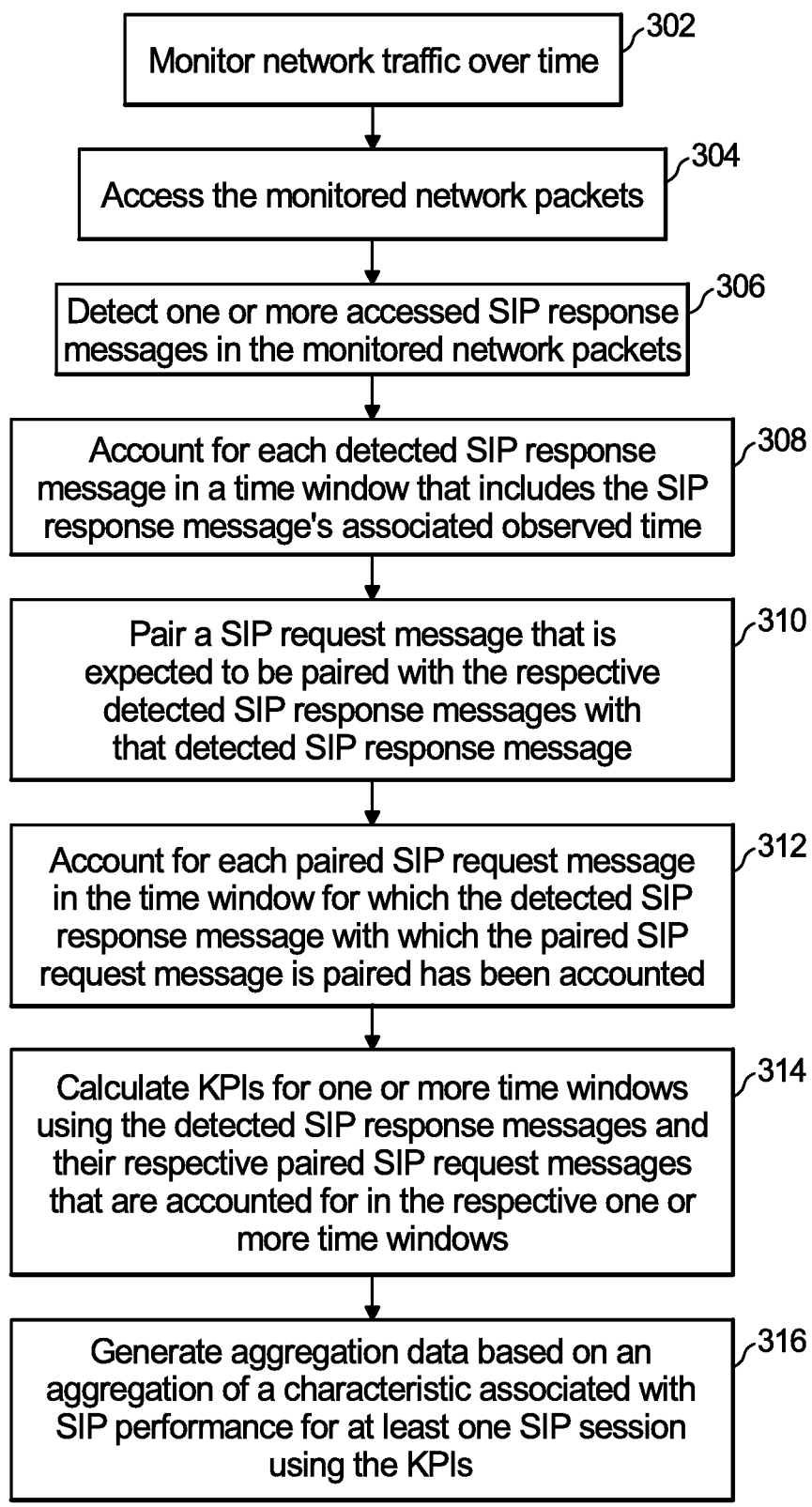
FIG. 3 illustrates a flowchart of an example method for calculating SIP key performance indicators (KPIs) for multimedia communication in a network in accordance with an illustrative embodiment of the present disclosure.

With reference now to FIG. 3, shown is a flowchart demonstrating implementation of the various exemplary embodiments. It is noted that the order of operations shown in FIG. 3 is not required, so in principle, the various operations may be performed out of the illustrated order. Also certain operations may be skipped, different operations may be added or substituted, or selected operations or groups of operations may be performed in a separate application following the embodiments described herein.

At operation 302, a packet monitor, such as packet monitor 108 shown in FIG. 1, monitors network traffic over time, including monitoring network packets or packet summaries that flow to, from, and within a network. The network traffic includes network packets, such as SIP response and request messages.

At operation 304, a packet analysis system, such as the packet analysis system 112 shown in FIG. 1, accesses the monitored network traffic, including the monitored packets or packet summaries. These monitored network packets or packet summaries can be stored in the network monitor or associated storage, such as storage device 114 shown in FIG. 1. Accessing data refers to any of reading, copying, retrieving, receiving a transmission with or without requesting the transmission, or otherwise obtaining. The accessed monitored network packets or packet summaries. At operation 306, one or more accessed SIP response messages of the monitored network packets are detected. The SIP response messages each have an associated observed time that indicates the time at which an associated packet was observed during monitoring. The SIP response messages can be associated with one or more SIP sessions. At operation 308, the detected SIP response messages are accounted for in a time window of a series of consecutive time windows that includes the respective SIP response message's associated observed time. The time windows can be, for example, five-second time intervals, without limitation.

At operation 310, a SIP request messages that is expected to be paired with each of the respective detected SIP response messages is paired with that detected SIP response message. Each SIP response message has an expected SIP request message based on SIP protocols. Accordingly, when an SIP response message is detected, its expected SIP request message can be determined based on SIP protocols even if it was not detected or tracked. Accordingly, this method can be performed with or without detection of SIP request messages. At operation 312, each respective paired SIP request message is accounted for in the time window for which the detected SIP response message with which the paired SIP request message is paired has been accounted.

At operation 314, one or more KPIs are calculated for one or more time windows using the detected SIP response messages and their respective paired SIP request messages that are accounted for in the respective one or more time windows. At operation 316, aggregation data is generated based on an aggregation of a characteristic associated with SIP performance for one or more different SIP sessions associated with the detected SIP response messages and their respective paired SIP request messages using the KPI(s). The KPIs and aggregation data can be determined for a time interval that includes a selected number of consecutive time windows.

Steps 302-308 or steps 302-310 can be performed in near real-time. Accordingly, near real-time KPI data and aggregation data is generated that indicates SIP performance in near real-time, regardless of whether the respective SIP sessions have been completed. Additionally, the KPI data and aggregation data is performed without correlating multiple SIP messages to SIP sessions and tracking SIP sessions.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the packet monitor 108 and/or packet analysis system 112 may be implemented or executed by one or more computer systems. For example, the packet monitor 108 and/or packet analysis system 112 can be implemented using a computer system such as example computer system 402 illustrated in FIG. 4. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 402 is only one example of a suitable system and is not intended to suggest any limitation as to the scope of use or functionality of embodiments of the disclosure described herein. Regardless, computer system 402 is capable of being implemented and/or performing any of the functionality set forth hereinabove.

Computer system 402 may be described in the general context of computer system-executable instructions, such as program modules, being executed by a computer system. Generally, program modules may include routines, programs, objects, components, logic, data structures, and so on that perform particular tasks or implement particular abstract data types. Computer system 402 may be practiced in distributed data processing environments where tasks are performed by remote processing devices that are linked through a communications network. In a distributed data processing environment, program modules may be located in both local and remote computer system storage media including memory storage devices.

Figure 4:
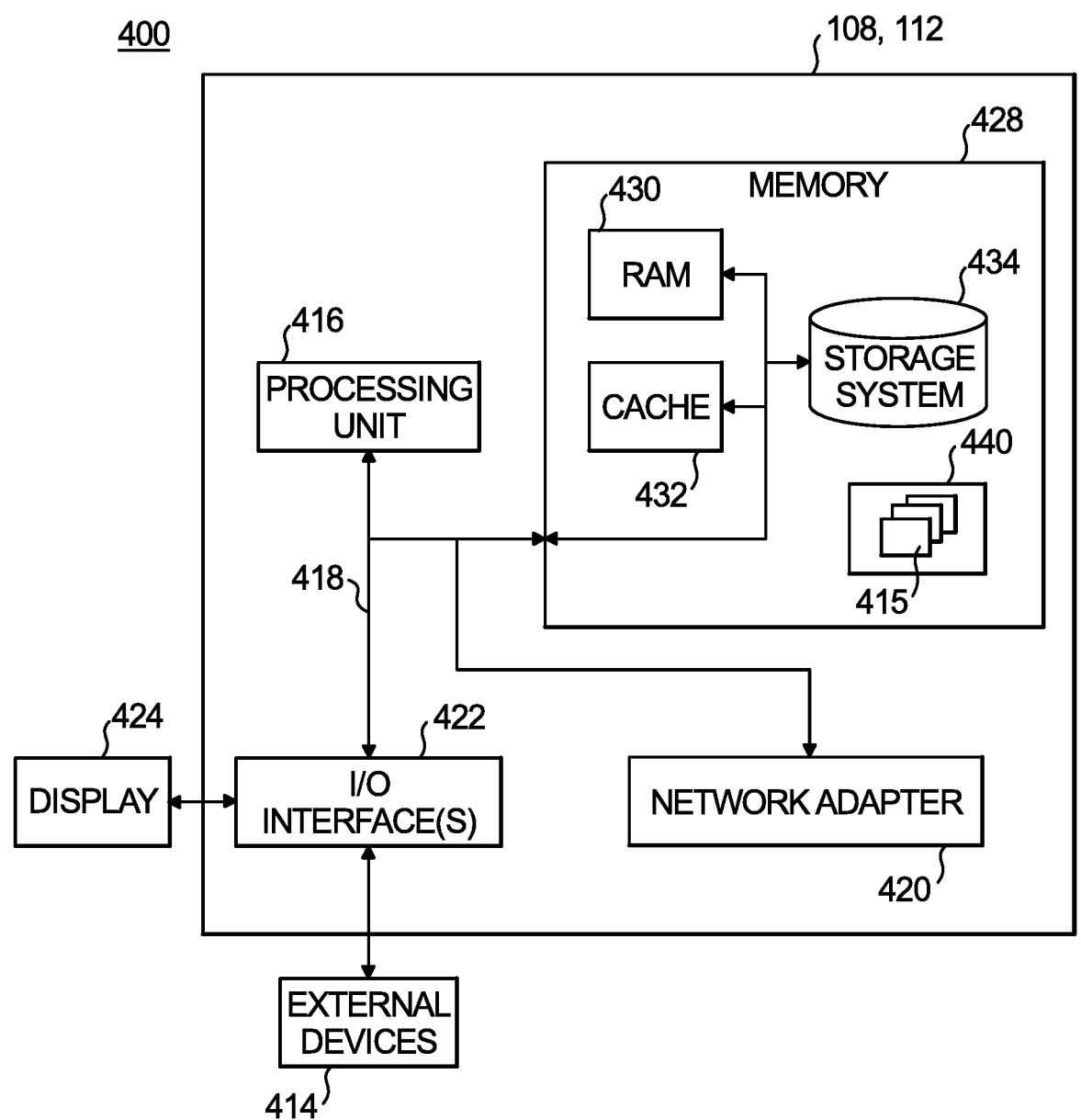
FIG. 4 illustrates a schematic block diagram of an example packet monitor or packet analysis system, in accordance with an illustrative embodiment of the present disclosure.

Computer system 402 is shown in FIG. 4 in the form of a general-purpose computing device. The components of computer system 402 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 402 typically includes a variety of computer system readable media. Such media may be any available media that is accessible by network management server 104, and it includes both volatile and non-volatile media, removable and non-removable media.

System memory 428 can include computer system readable media in the form of volatile memory, such as random access memory (RAM) 430 and/or cache memory 432.

Computer system 402 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415, such as computer system 402, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 402 may also communicate with one or more external devices 414 such as a keyboard, a pointing device, a display 424, etc.; one or more devices that enable a user to interact with computer system 402; and/or any devices (e.g., network card, modem, etc.) that enable network management server 104 to communicate with one or more other computing devices. Such communication can occur via Input/Output (I/O) interfaces 422. Still yet, computer system 402 can communicate with one or more networks such as a local area network (LAN), a general wide area network (WAN), and/or a public network (e.g., the Internet) via network adapter 420. As depicted, network adapter 420 communicates with the other components of network management server 104 via bus 418. It should be understood that although not shown, other hardware and/or software components could be used in conjunction with computer system 402. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed system and method include accurate calculation and aggregation of KPI data in near real-time, regardless of whether an SIP session has completed, without session correlation and tracking. Conventional systems and methods require session correlation and tracking, as well as session completion and generation of xDRs generation before KPIs and aggregated data can be determined. Thus conventional systems and methods incur delays before KPIs and aggregated data can be determined and require relatively high resource (memory, CPU, disk) utilization. Since conventional systems and methods cannot determine KPIs and aggregated data in until SIP sessions are completed and xDRs generated, these methods cannot be performed in near real-time. KPIs and aggregated data determined at a particular time are inaccurate since they do not reflect information about SIP sessions that are still in progress. Thus, the disclosed system and methods provides improved accuracy, performance, and scalability relative to conventional systems and methods.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method for calculating session initiation protocol (SIP) key performance indicators (KPIs) for multimedia communication in a network comprising: accessing network packets or packet summaries monitored overtime; detecting a SIP response message of the monitored network packets or packet summaries, the SIP response message having an associated observed time at which an associated packet was observed during monitoring;

accounting for the detected SIP response message in a time window of a series of consecutive time windows that includes the SIP response message's associated observed time, each time window beginning at a first time and ending at a second time;

determining an expected SIP response message based on SIP protocols when a SIP request message is not detected within a predetermined time window;

pairing the expected SIP request message with the detected SIP response message; accounting for the paired SIP request message in the time window with which the detected SIP response message is accounted; and calculating a KPI for the time window using the detected SIP response message and its paired determined SIP request message that are accounted for in the time window;

detecting a plurality of SIP response messages of the monitored network packets or packet summaries, each of the SIP response messages having an associated observed time at which an associated packet was observed during monitoring;

accounting for each detected SIP response message in a time window of the series of consecutive time windows that includes the SIP response message's associated observed time;

pairing a SIP request message expected to be paired with the respective detected SIP response messages with that detected SIP response message;

accounting for each paired SIP request message in the time window for which the detected SIP response message with which the paired SIP request message is paired has been accounted;

calculating at least one KPI for one or more time windows using the detected SIP response messages and their respective paired SIP request messages that are accounted for in the respective one or more time windows; and generating aggregation data based on an aggregation of a characteristic associated with SIP performance for at least one SIP session using the at least one KPI.

2. The method of claim 1, wherein the KPI is calculated before a SIP session associated with the SIP response message and its paired SIP request message has been completed.

3. The method of claim 1, wherein the KPI is selected from at least one of session establishment effectiveness ratio (SEER), answer size ratio (ASR), network effectiveness ratio (NER), and session completion ration (SCR).

4. The method of claim 1, wherein the duration of the consecutive time windows is selectable.

5. The method of claim 1, wherein the KPI measures characteristics associated with a SIP session to which the SIP response message and its paired SIP request message are associated.

6. The method of claim 1, wherein the plurality of SIP response message are associated with different SIP sessions and the aggregation data is generated based on aggregation of the characteristic associated with SIP performance for different SIP sessions.

7. The method of claim 1, wherein the multimedia communication in the network uses SIP protocol in conjunction with one or more additional application layer protocols, including session description protocol (SDP), real-time transport protocol (RTP), secure RTP (SRTP), transmission control protocol (TCP), transport layer security (TLS), user datagram protocol (UDP), and stream control transmission protocol (SCTP).

8. The method of claim 1, wherein accessing the monitored network packets or packets summaries, detecting the SIP response message, accounting for the detected SIP response message, pairing the SIP request message, accounting for the paired SIP request message, and calculating the KPI is performed in near real-time.

9. A system for calculating session initiation protocol (SIP) key performance indicators (KPIs) for multimedia communication in a network, the system comprising:

a memory configured to store instructions;

a processor disposed in communication with the memory, wherein the processor upon execution of the instructions is configured to:

access network packet summaries monitored over time;

detect a SIP response message of the monitored packet summaries, the SIP response message having an associated observed time at which an associated packet was observed during monitoring;

account for the detected SIP response message in a time window of a series of consecutive time windows that includes the SIP response message's associated observed time each time window beginning at a first time and ending at a second time;

determine an expected SIP response message based on SIP protocols when a SIP request message is not detected within a predetermined time window;

pair the expected SIP request message with the detected SIP response message; account for the paired SIP request message in the time window with which the detected SIP response message is accounted; and calculate a KPI for the time window using the detected SIP response message and its paired determined SIP request message that are accounted for in the time window;

detect a plurality of SIP response messages of the packet summaries, each of the SIP response messages having an associated observed time at which an associated packet was observed during monitoring;

account for each detected SIP response message in a time window of the series of consecutive time windows that includes the SIP response message's associated observed time;

pair a SIP request message expected to be paired with the respective detected SIP response messages with that detected SIP response message;

account for each paired SIP request message in the time window for which the detected SIP response message with which the paired SIP request message is paired has been accounted;

calculate at least one KPI for one or more time windows using the detected SIP response messages and their respective paired SIP request messages that are accounted for in the respective one or more time windows; and generate aggregation data based on an aggregation of a characteristic associated with SIP performance for a plurality of SIP sessions associated with the detected SIP response message and their respective paired SIP request messages using the KIPs.

10. The system of claim 9, wherein the KPI is calculated before a SIP session associated with the SIP response message and its paired SIP request message has been completed.

11. The system of claim 9, wherein the KPI measures characteristics associated with a SIP session to which the SIP response message at its paired SIP request message are associated.

12. The system of claim 9, wherein the plurality of SIP response messages are associated with different SIP sessions and the aggregation data is generated based on aggregation of the characteristic associated with SIP performance for different SIP sessions.

13. The system of claim 9, wherein accessing the monitored network packets or packet summaries, detecting the SIP response message, accounting for the detected SIP response message, pairing the SIP request message, accounting for the paired SIP request message, and calculating the KPI is performed in near real-time.

14. A non-transitory computer readable storage medium and one or more computer programs embedded therein, the computer programs comprising instructions, which when executed by a computer system, cause the computer system to:

access network packets monitored or packet summaries overtime; detect a SIP response message of the monitored network packets or packet summaries, the SIP response message having an associated observed time at which an associated packet was observed during monitoring;

account for the detected SIP response message in a time window of a series of consecutive time windows that includes the SIP response message's associated observed time each time window beginning at a first time and ending at a second time;

determine an expected SIP response message based on SIP protocols when a SIP request message is not detected within a predetermined time window;

pair the expected SIP request message with the detected SIP response message;

account for the paired SIP request message in the time window with which the detected SIP response message is accounted; and calculate a KPI for the time window using the detected SIP response message and its paired determined SIP request message that are accounted for in the time window;

detect a plurality of SIP response messages of the monitored network packets or packet summaries, each of the SIP response messages having an associated observed time at which an associated packet was observed during monitoring;

account for each detected SIP response message in a time window of the series of consecutive time windows that includes the SIP response message's associated observed time;

pair a SIP request message expected to be paired with the respective detected SIP response messages with that detected SIP response message;

account for each paired SIP request message in the time window for which the detected SIP response message with which the paired SIP request messages is paired has been accounted;

calculate at least one KPI for one or more time windows using the detected SIP response messages and their respective paired SIP request messages that are accounted for in the respective one or more time windows; and generate aggregation data based on an aggregation of a characteristic associated with SIP performance for at least one SIP session using the at least one KPI.

15. The computer readable storage medium of claim 14, wherein the KPI is calculated before a SIP session associated with the SIP response message and its paired SIP request message has been completed.

16. The computer readable storage medium of claim 14, wherein the plurality of SIP response messages are associated with different SIP sessions and the aggregation data is generated based on aggregation of the characteristic associated with SIP performance for different SIP sessions.

17. The computer readable storage medium of claim 14, wherein accessing the monitored network packets or packet summaries, detecting the SIP response message, accounting for the detected SIP response message, pairing the SIP request message, accounting for the paired SIP request message, and calculating the KPI is performed in near real-time.

* * * * *